(12) United States Patent
Yang et al.

(10) Patent No.: US 9,836,152 B1
(45) Date of Patent: Dec. 5, 2017

(54) SINGLE SUBSTRATE LAYER FORCE SENSOR

(71) Applicant: Amazon Technologies, Inc., Seattle, WA (US)

(72) Inventors: Jung Sik Yang, Cupertino, CA (US); Charles Robert Watson, Sunnyvale, CA (US); Edward Albert Liljegren, San Francisco, CA (US); Angeles Marcia Almanza-Workman, Sunnyvale, CA (US); Reuben Eric Martinez, Pueblo West, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/750,843

(22) Filed: Jun. 25, 2015

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04101* (2013.01); *G06F 2203/04103* (2013.01); *G06F 2203/04105* (2013.01); *G06F 2203/04106* (2013.01); *Y10S 977/72* (2013.01); *Y10S 977/762* (2013.01); *Y10S 977/953* (2013.01)

(58) Field of Classification Search
CPC .................. G06F 3/0414; G06F 3/044; G06F 2203/04103; G06F 2203/04105
USPC .................................................. 345/174, 173
See application file for complete search history.

(56) References Cited

U.S. PATENT DOCUMENTS

| 9,256,330 | B2* | 2/2016 | Joharapurkar | G06F 3/044 |
|---|---|---|---|---|
| 2012/0038583 | A1* | 2/2012 | Westhues | G06F 3/0412 |
| | | | | 345/174 |
| 2014/0211111 | A1* | 7/2014 | Misaki | G06F 3/044 |
| | | | | 349/12 |
| 2014/0267152 | A1* | 9/2014 | Curtis | G06F 3/0414 |
| | | | | 345/174 |
| 2015/0002447 | A1* | 1/2015 | Schediwy | G06F 1/1692 |
| | | | | 345/174 |
| 2015/0130742 | A1* | 5/2015 | Chen | G06F 3/044 |
| | | | | 345/174 |
| 2016/0170540 | A1* | 6/2016 | Yang | G06F 3/0412 |
| | | | | 345/173 |
| 2016/0188039 | A1* | 6/2016 | Yoon | G06F 3/044 |
| | | | | 345/174 |
| 2016/0188082 | A1* | 6/2016 | Ham | G06F 3/0416 |
| | | | | 345/174 |

* cited by examiner

*Primary Examiner* — Yuzhen Shen
(74) *Attorney, Agent, or Firm* — Lee & Hayes, PLLC

(57) ABSTRACT

The single layer compressive substrate force sensor may include electrode patterns formed directly on a first side and second side of the compressive substrate. At least some of the electrode patterns are configured to provide a change in capacitance proportional with a compressive force applied to at least one of the electrode patterns, which compresses the compressive substrate. The single layer compressive substrate force sensor may include a first top electrode and a second top electrode pattern separated by an insulator to void contact between the electrode patterns. In operation, the first top electrode pattern and the second top electrode pattern are configured to provide projective capacitance, and thus provide detection of light touches or hover actions by an object.

16 Claims, 9 Drawing Sheets

Section A-A

Section B-B

… (1)

SINGLE SUBSTRATE LAYER FORCE SENSOR

BACKGROUND

Computing devices have become commonplace in almost every environment. For example, mobile telephones, laptop computers, and tablet computers are commonly used for work and pleasure and accompany people in many daily activities. Due to their widespread use, form-factor size and cost are significant considerations for consumers of computing devices.

Many computing devices use touch sensors to enable receipt of user input, such a via a touch screen display. Some touch screen displays use force sensitive capacitance (FSC) touch sensors to detect touch inputs by a user or by another device, such as a stylus. Current FSC touch sensors are formed of multiple layers and include upper and lower substrates with an intermediate compressive layer between the upper and lower substrates. The upper and lower substrates (e.g., polyethylene terephthalate (PET) or other similar substrates or films) include conductive trace electrode patterns. The electrode patterns are used to create a capacitive field. When a gap, filled by the compressive layer, is decreased between the two substrates (e.g., the two substrates are pressed together and the gap is narrowed), the capacitance changes and the amount and velocity of deflection, and therefore force, can be calculated. The intermediate compressive layer maintains a known gap or distance between the upper and lower substrate layers, thus creating a consistent baseline from which to base the deflection calculation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
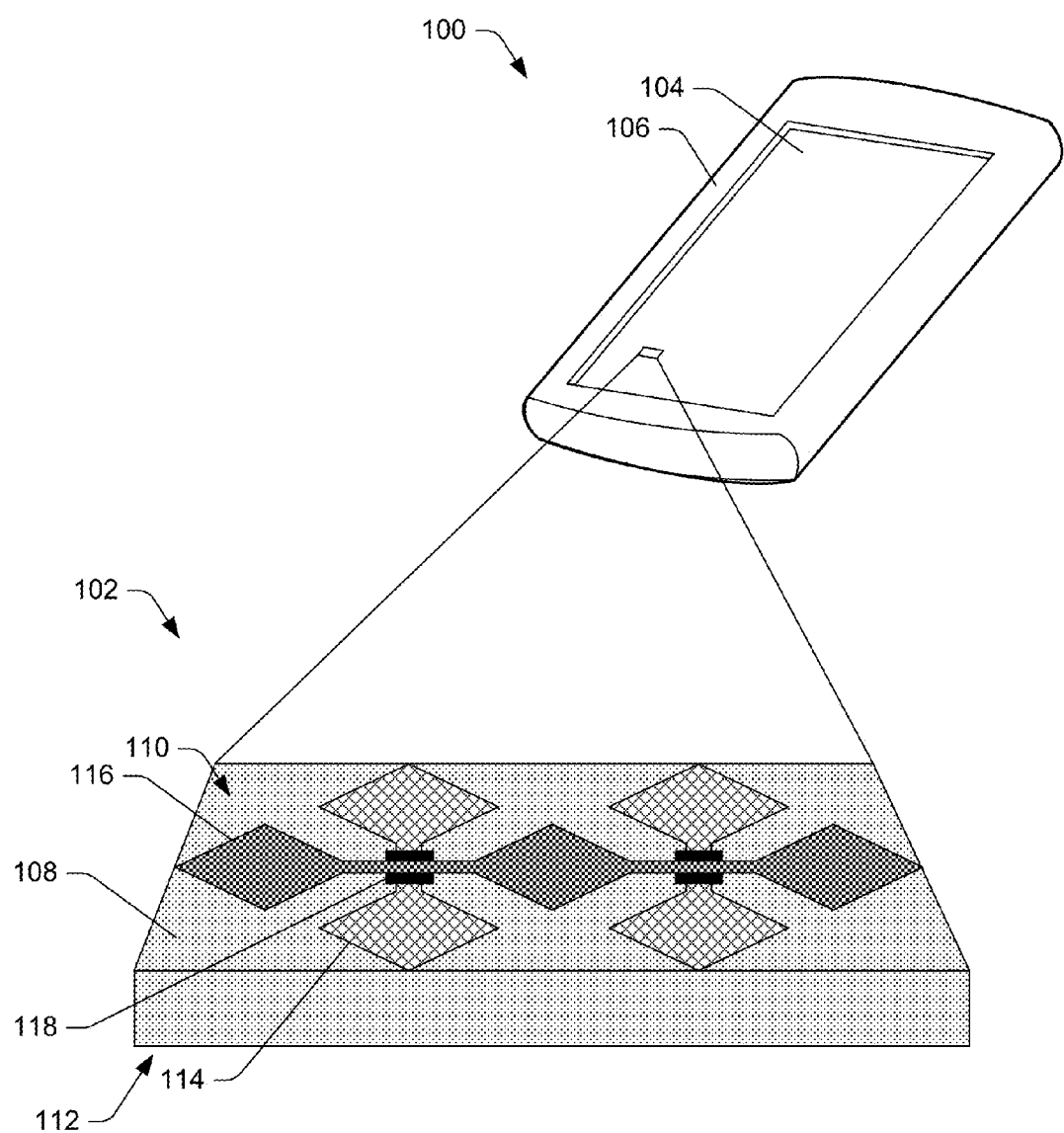
FIG. 1 is an isometric view of an illustrative electronic device that includes an illustrative single layer compressive substrate force sensor.

This disclosure is directed at least partly to a single layer compressive substrate force sensor and techniques to create the same. The single layer compressive substrate force sensor may include sets of electrode (or patterns) formed directly on at least a first side and second side of a compressive substrate, where the first side and the second side are parallel to one another. In some embodiments, the electrode patterns are configured to enable an integrated circuit (IC) to detect a change in capacitance proportional with a compressive force applied to at least one of the electrode patterns, which compresses the compressive substrate. The electrode patterns may be created by adding material to the compressive substrate, such as by additive printing, photolithography or screen printing. In various embodiments, material may be removed to form the electrode pattern using a material subtractive process such as laser etching or laser ablation.

By forming the electrode patterns directly on the compressive substrate, the overall thickness of the force sensor may be reduced considerably. In addition, by forming the electrode patterns directly on the compressive layer, the touch sensor may flex and bend without resistance caused by other layers and/or possibly without compromising functionality of the touch sensor. Further, elimination of additional substrates may reduce cost to create the touch sensor. Other benefits of the single layer compressive substrate force sensor may also be present.

In some embodiments, the single layer compressive substrate force sensor may include a first top contiguous electrode pattern formed as rows and a second top contiguous electrode pattern formed as columns. However, the single layer compressive substrate force sensor may include a first top contiguous electrode pattern formed as columns and a second top contiguous electrode pattern formed as rows, thus the "row" and "column" designation discussed herein is not limiting, but used to illustrate examples. An IC may cause the first top contiguous electrode pattern to operate as a transmitter and the first top contiguous electrode pattern to operate as a receiver, which receives electrical flow from the transmitter, and thus is used by the IC to measure a change in capacitance. The first top contiguous electrode pattern and the second top contiguous electrode pattern may be separated by a non-conductive insulator to electrically and physical separate the electrode patterns. The single layer compressive substrate force sensor may include a bottom electrode pattern, which may be configured by the IC as a second electrical receiver. In such a configuration, the IC may share operation of the transmitter with both receiver electrode patterns, as described in more detail below. In various embodiments, the single layer compressive substrate force sensor may include on receiver electrode pattern which has shared usage by two transmitter electrode patterns. The IC may be connected to a power source, which may provide electricity to one or more of the electrode patterns under control of the IC.

In operation, the first top contiguous electrode pattern and the second top contiguous electrode pattern are configured to operate using projective capacitance, and thus detect a change in an electrical field resulting from introduction of an object (finger, input device, etc.) proximate to the electrode patterns. In operation, the first and second top contiguous electrode patterns may detect locations of objects relative to a touch surface even when the objects exert little or no force against the compressive substrate, and thus provide hover and/or feather touch sensing (i.e., touch sensing with nominal force). In addition or separately, the first top contiguous electrode pattern and the bottom electrode pattern are configured to measure forces that cause deflection of the first top contiguous electrode pattern, which creates a distortion of the first top contiguous electrode pattern (via bending) and a change in the electrical field, which is measurable by the IC via an electrode pattern configured as a receiver. Thus, the first top contiguous electrode pattern and the bottom electrode pattern detect and measure touch inputs of forces, and are particularly useful in detecting changes in forces applied against the first top contiguous electrode pattern.

The apparatuses and techniques described herein may be implemented in a number of ways. Example implementations are provided below with reference to the following figures.

FIG. 1 is an isometric view of an illustrative electronic device 100. The electronic device includes an illustrative single layer compressive substrate force sensor 102, which may be a portion or component of a touch sensor 104 secured by a housing 106. The touch sensor 104 may be configured as a touch sensing display, a touch pad (without a display), and/or as another touch sensing device (e.g., fingerprint reader, etc.). As discussed herein, a "touch input" is the input received by the electronic device when, e.g., a user's finger, a stylus, and/or other similar input devices makes physical contact with the electronic device. As discussed herein, the term "touch input" may include imposing a force against the touch sensor, which causes deflection of a surface of the touch sensor. The term "touch input" also includes hover actions (which may not include physical contact with the touch sensor) or touches that may only cause nominal deflection of the surface, where the hover actions and the touches cause a change in the electrical field of the electrode patterns. For example, when the input device (e.g., a stylus, a finger, etc.) is present and alters or changes an electrical field formed by electrode patterns (e.g., via projective capacitance), the input device may not have to actually make contact with the touch sensor for the touch sensor to detect presence of the input device. This type of sensing is often used for movement-based operations, such as to detect and track movement of one or more fingers across a touch sensor.

The touch sensor 104 may include the single layer compressive substrate force sensor 102, which may include a micro-electrode pattern, nano-electrode pattern, or other small electrode pattern such that the electrode pattern may not be readily visible by a naked eye. As discussed herein, an "electrode pattern" may be a row, column, or other formation of electrodes formed on a compressive substrate 108. The electrode patterns may be formed or applied directly to the compressive substrate 108. As discussed below, the compressive substrate 108 may undergo surface treatment prior to the application or formation of the electrode patterns, which is defined as within the scope of the terminology of "directly on," as used here.

The compressive substrate 108 may be formed of a compressible substance with high resilience to wear, and can thus withstand a long duty cycle (e.g., greater than thousands of compressions/bends without substantial degradation in shape and/or performance). The compressive substrate may be formed of silicone, urethane (e.g., Poron® urethane), or other similar materials having similar compression and resilience properties.

The compressive substrate 108 may include electrodes patterns formed directly on a top surface 110 of the compressive substrate 108 and directly on a bottom surface 112 of the compressive substrate 108. The top surface 110 may be parallel or nearly parallel to the bottom surface 112. The electrodes may be formed in patterns, such as contiguous electrode patterns deposited, cured, or etched on the surfaces of the compressive substrate 108. The patterns may be formed as rows and/or columns, which may be formed by connecting formations, such as diamonds or other polygon-shaped formations together.

The electrode patterns may be formed by adding material (e.g., Indium Tin Oxide (ITO), Carbon Nanotube (CNT), Silver Nanowire (AgNW), copper, silver, composites, graphite, and/or any other electrically conductive material). Additive formation techniques may include, without limitation, three-dimensional (3D) printing techniques, screen printing, photolithography, and sputtering. In some embodiments, material may be removed to form separations between different electrode patterns, such as by using laser etching, laser ablation, and/or other subtractive or etching techniques.

As shown in FIG. 1, a first top contiguous electrode pattern 114 (or simply "first electrode pattern 114") may be formed directly to the compressive substrate 108. In some embodiments, the first electrode pattern 114 may be formed as a row and configured by the IC to operate as an electrical transmitter that creates an electrical field between the first top contiguous electrode pattern 114 and a second top contiguous electrode pattern 116 (or simply "second electrode pattern 116"). The second electrode pattern 116 may be applied directly to the compressive substrate 108. In various embodiments, the second electrode pattern 116 may be formed as a column and configured by the IC to operate as an electrical receiver, which works with the transmitter to enable the IC to detect a change in capacitance due to presence of a finger or other input device that changes an electrical field of the transmitter electrode pattern, that is detected by the receiver electrode pattern. The first electrode pattern 114 and the second electrode pattern 116 are configured, by the IC, to provide first touch sensing by detecting changes in an electrical field caused by presence of a finger or other input device. For example, the IC may configure the first electrode pattern 114 as a transmitter that generates an electrical field. The IC may configure the second electrode pattern 116 as a receiver, which can detect attributes of the electrical field generated by the transmitter. A presence of a finger or input device may modify the electrical field, and be detected via the receiver to enable the IC to determine a location of the finger or input device relative to the electrode patterns. This type of touch input is referred to herein as a hover interaction or light feather touch.

One or more insulators 118 may be formed on the compressive substrate 108 to create isolation between different electrode patterns in areas that the electrode patterns overlap (or will overlap after the single layer compressive substrate force sensor is formed). The insulators may prevent electrical conductivity between the first electrode pattern 114 and the second electrode pattern 116, while also creating a gap between the electrode patterns. As discussed below in FIGS. 4-7, the insulators may be formed using a hard coat non-conductive material that is applied to local areas on the surface of the compressive substance where the first electrode pattern 114 and the second electrode pattern 116 overlap, or globally to a majority of a surface of the compressive substance. Examples of insulator materials include, without limitation, Toray PT030®, Toray NSE-2000®, Everlight Chemical EOC230®, and Kaneka Illumika-R®.

Figure 2A:
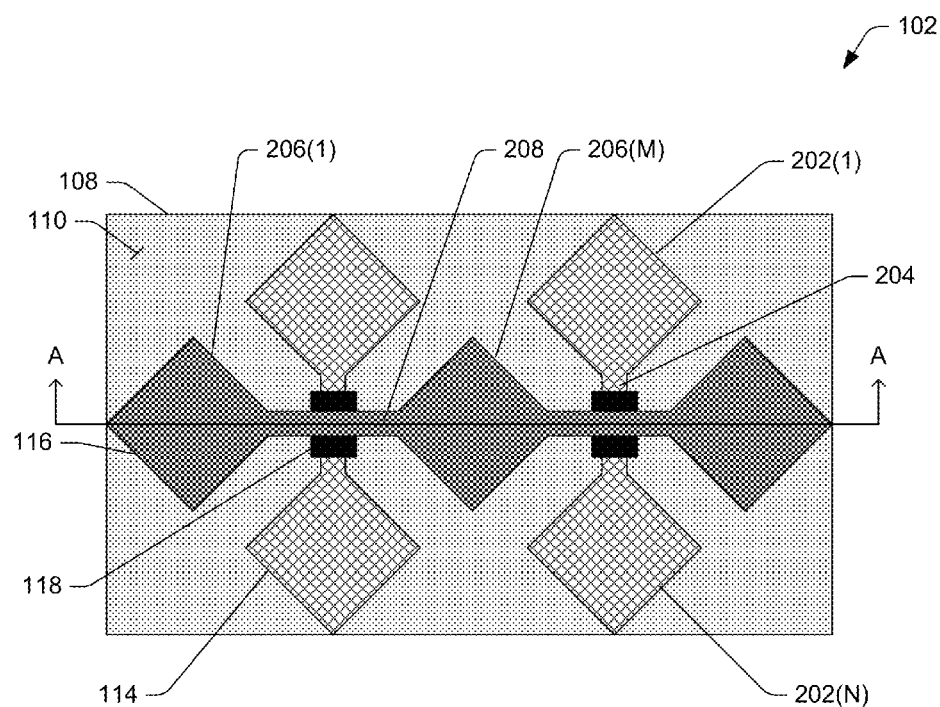
FIG. 2A is top plan view of the single layer compressive substrate force sensor shown in FIG. 1.

FIG. 2A is top plan view of the top surface 110 of the single layer compressive substrate force sensor 102 shown in FIG. 1. The single layer compressive substrate force sensor includes the first electrode pattern 114 (shown as a column), which may include a first formation 202(1) connected to a second formation 202(N) by a first jumper 204. The jumper may be formed at the same time as the first electrode pattern 114. The formations may be formed as diamonds, polygons, or other shapes, which are sometimes specified by a manufacturer of particular type of IC. The electrode pattern may include many formations, each connected to at least one other formation by a respective jumper to create a contiguous electrode pattern (e.g. a full column of multiple columns that are ultimately connected to the IC). The formations may span a length or width of the touch screen (e.g., the touch screen 104 shown in FIG. 1). The first jumper 204 may be formed at a same time as the formation or at a later time.

The single layer compressive substrate force sensor also includes the second electrode pattern 116, which may include a third formation 206(1) connected to a fourth formation 206(M) by a second jumper 208. The electrode pattern may include many formations, each connected to at least one other formation by a respective jumper to create a contiguous electrode pattern (e.g. a full row of multiple rows that are ultimately connected to the IC). The second jumper 208 may be formed at a same time as the formation or at a later time, such as after creation of the insulator 118.

Figure 2B:
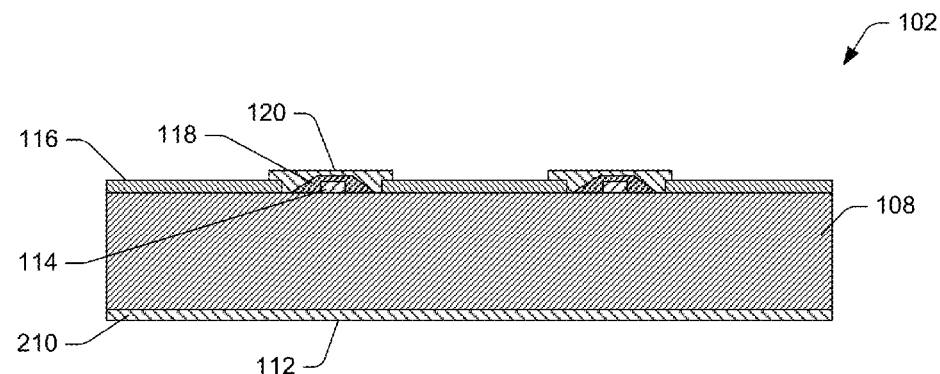
FIG. 2B is cross-sectional side elevation view of the single layer compressive substrate force sensor shown in FIG. 2A.

FIG. 2B is cross-sectional side elevation view of the single layer compressive substrate force sensor shown in FIG. 2A along section line A-A. As shown in FIG. 2B, a third bottom electrode pattern 210 (or simply "third electrode pattern 210") may be applied directly to the bottom surface 112 of the compressive substrate 108. The third electrode pattern 210 may be configured by the IC to operate as an electrical receiver when the first electrode pattern 114 is configured by the IC to operate as a transmitter (or vice versa). The first electrode pattern 114 and the third (bottom) electrode pattern 210 are configured to detect or measure touch input of forces (forces that compress the top surface 110 and the compressive substrate 108 towards the bottom surface 112). For example, the IC may configure the first electrode pattern 114 as a transmitter that generates an electrical field between the first electrode pattern 114 and the third (bottom) electrode pattern 210. The IC may configure the third (bottom) electrode pattern 210 as a receiver, which can detect attributes of the electrical field generated by the transmitter. Deformation of first electrode pattern 114 causes a change in capacitance of the electrical field, which can be detected by the receiver and associated with a location of the finger or input device relative to the electrode pattern and associated with an analog force value (which varies with the amount of deflection of the first electrode pattern 114). This type of touch input is referred to herein as force touch. The third electrode pattern 210 may be a row of multiple rows connected to the IC (when the first electrode pattern is arranged as columns, or vice versa). The third electrode pattern 210 may be contiguous and may be formed of formations connected by jumpers or formed using other electrode patterns. As shown in FIG. 2B, a jumper 120 may be formed of an electrically conductive material and may connect adjacent formations of an electrode pattern, such as the second electrode pattern 116 as shown in FIG. 2B. The jumper 120 may be formed of a same material as the second electrode pattern 116 or may be formed of a different material than the second electrode pattern 116. The jumper may be formed by photolithography, sputtering, and/or any other additive and/or subtractive process described herein to create the jumper to connect adjacent portions of an electrode pattern, which may be formed to bridge very small gaps at a micro and nano-scale.

FIGS. 3-6 show illustrative processes that are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes. The processes are described with reference to FIGS. 1, 2A and 2B.

Figure 3:
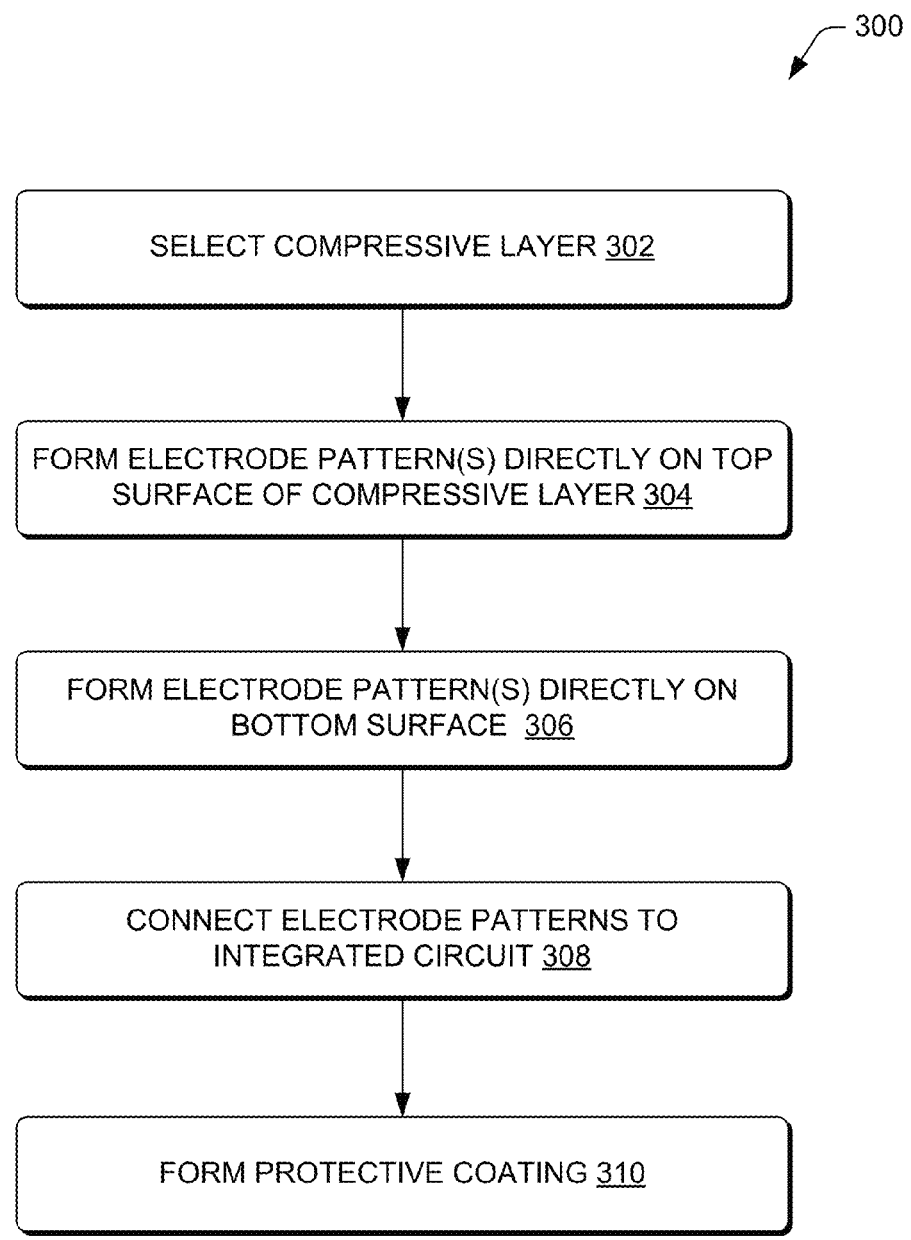
FIG. 3 is a flow diagram of an illustrative process to create a single layer compressive substrate force sensor.

FIG. 3 is a flow diagram of an illustrative process 300 to create a single layer compressive substrate force sensor.

At 302, the compressive substrate 108 may be selected or provided to be electrode patterned to create the single layer compressive substrate force sensor. The selection may include a selection of the material or composition of the substrate, the compressive properties of the substrate, and/or the size and thickness of the substrate.

At 304, one or more electrode patterns may be formed directly on the top surface 110 of the compressive substrate 108. The electrode patterns may include at least the first electrode pattern 114 and/or the second electrode pattern 116. The formation may include one or more additive processes (3D printing, screen printing, photolithography, etc.) and optionally one or more subtractive processes (etching, laser ablation, etc.). In some embodiments, one or more of the processes may be performed multiple times to create an electrode pattern, such as by multiple passes over the compressive substrate 108 during application and/or removal of material. As discussed below, an electrode pattern may be completed in non-consecutive operations, such as by adding a jumper between formations at a later stage in the creation of an electrode pattern. In some embodiments, the top surface 110 of the compressive substrate 108 may be treated prior to forming the electrode pattern, such as by applying a bonding agent, cleaning solution, or other surface treatment. As used herein, the terminology of "directly on . . . the compressive substrate" considers use of such surface treatments as within the scope of the terminology of "directly on . . . the compressive substrate". In embodiments where the single layer compressive substrate force sensor is implemented in a display, the electrode patterns on the top surface 110 may be formed to allow passage of light through the electrode patterns, and thus may not be visible to the naked eye or may be only slightly visible, but allow passage of light through the display. For example, the electrode patterns may form a transparent conductive oxide application.

At 306, one or more electrode patterns may be formed directly on the bottom surface 112 of the compressive substrate 108. The electrode patterns may include the third electrode pattern 210. The formation may include one or more additive processes and optionally one or more subtractive processes. In some embodiments, the processes may be performed multiple times to create an electrode pattern, such as by multiple passes over the compressive substrate 108 during application and/or removal of material.

At 308, the electrode patterns may be connected to an IC that, during operation, uses the patterns to determine locations and/or forces associated with fingers and/or other input devices. The electrode patterns may be connected to the IC during formation of the electrode patterns. The IC may be connected to a power source. The IC may use one electrode pattern as a transmitter, which may be shared in use by other electrode patterns that are used as receivers. However, in various embodiments, the IC may use one electrode pattern as a receiver, which may be shared in use by other electrode patterns that are used as transmitters.

At 310 a protective coating may be applied to the compressive substrate 308 to protect the electrode patterns from wear, from the environment, and so forth. For example, a protective coating may be applied to the top surface 110 after the electrode patterns are created on the compressive substrate 108. The coating may be a flexible coating, such as a transparent coating, a film, or a glass layer.

Figure 4:
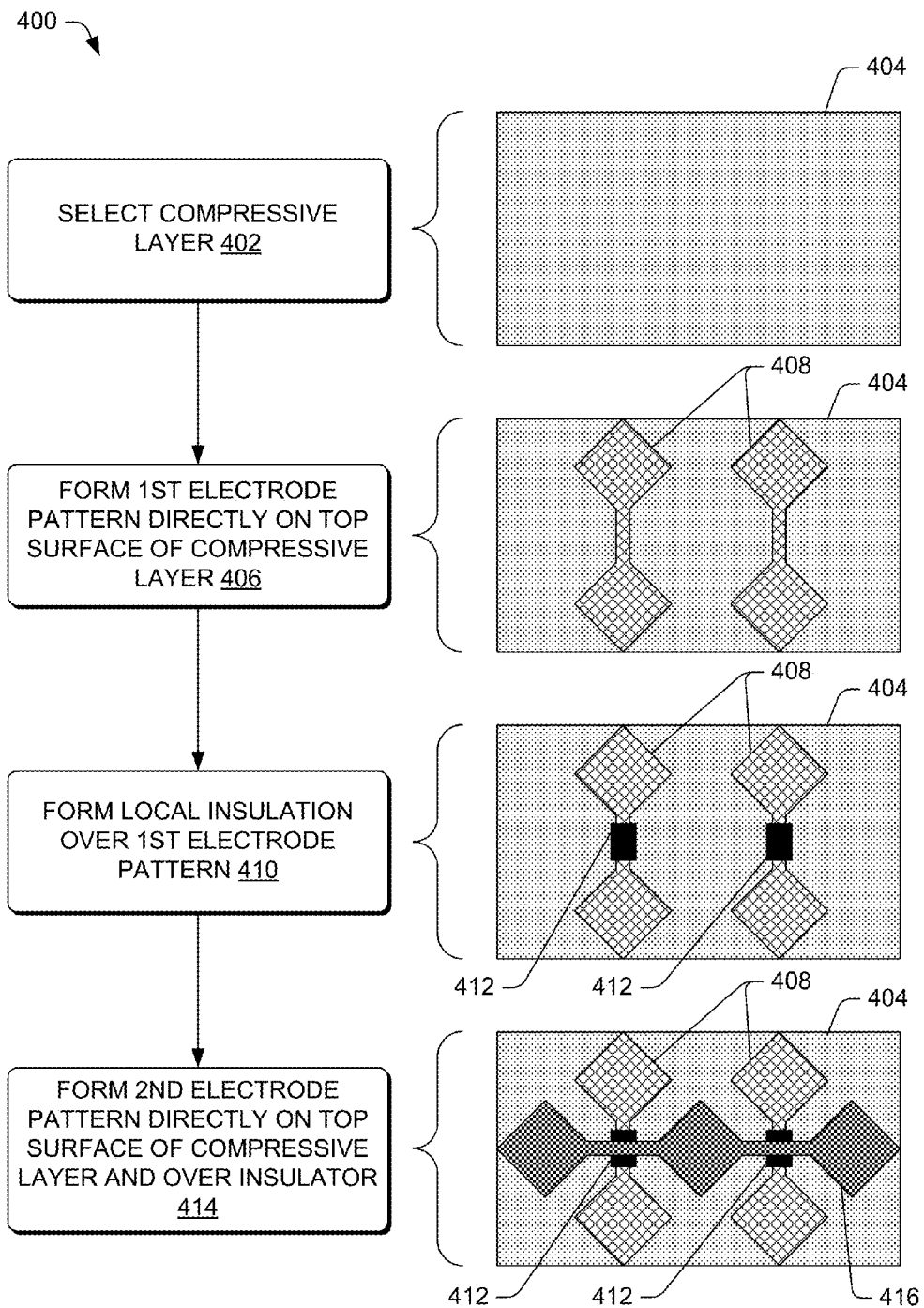
FIG. 4 is a pictorial flow diagram of an illustrative process to create a single layer compressive substrate force sensor using local isolation.

FIG. 4 is a pictorial flow diagram of an illustrative process 400 to create a single layer compressive substrate force sensor using a local insulator.

At 402, a compressive substrate 404 may be selected to be patterned to create the single layer compressive substrate force sensor. The selection may include a selection of the material or composition of the substrate, the compressive properties of the substrate, and/or the size and thickness of the substrate.

At 406, a first top contiguous electrode pattern 408 may be formed directly on the top surface 110 of the compressive substrate 404. The first top contiguous electrode pattern 408 may be formed using photolithography or any other technique discussed herein. As described herein, the electrode pattern is contiguous when multiple formations are joined by jumpers or other connectors. An electrode pattern may include multiple different contiguous portions (e.g., different rows or different columns).

At 410, one or more insulators 412 may be formed on the compressive substrate 404 over at least a portion of the first top contiguous electrode pattern 408 to create isolation between the first top contiguous electrode pattern 408 and a subsequent electrode pattern formed over the first top contiguous electrode pattern 408. The one or more insulators 412 may be formed as local insulators which may span a narrow portion of the first top contiguous electrode pattern 408 between the larger formations of the first top contiguous electrode pattern 408. The insulators may be formed by photolithography, sputtering, and/or other techniques as discussed herein.

At 414, a second top contiguous electrode pattern 416 may be formed directly on the top surface 110 of the compressive substrate 404 and over at least a portion of the first top contiguous electrode pattern 408 and over at least a portion of the one or more insulators 412. The second top contiguous electrode pattern 416 may be formed by photolithography and/or other techniques as discussed herein.

Figure 5:
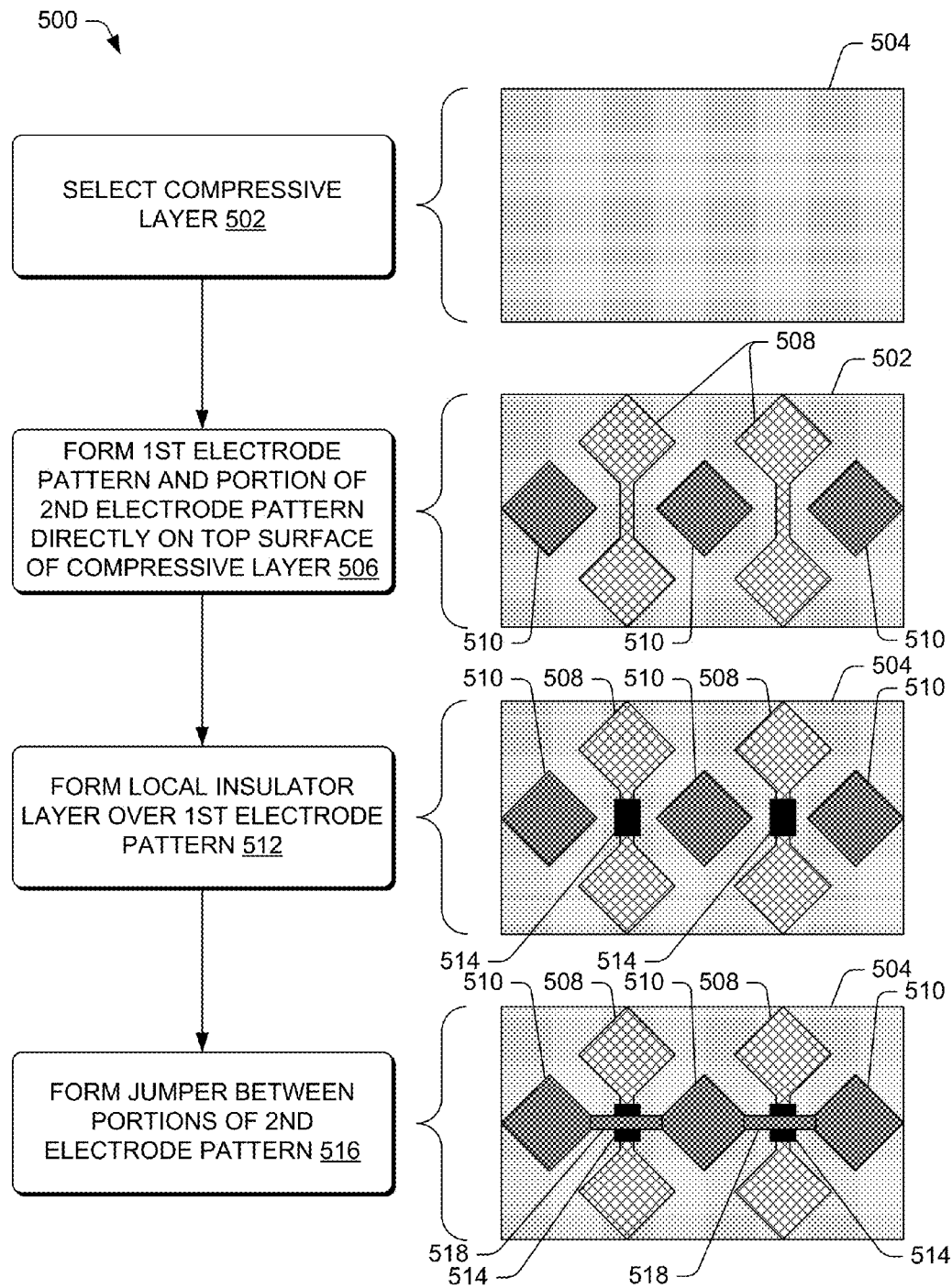
FIG. 5 is a pictorial flow diagram of another illustrative process to create a single layer compressive substrate force sensor using local isolation.

FIG. 5 is a pictorial flow diagram of another illustrative process 500 to create a single layer compressive substrate force sensor using a local insulator.

At 502, the compressive substrate 504 may be selected to be patterned to create the single layer compressive substrate force sensor. The selection may include a selection of the material or composition of the substrate, the compressive properties of the substrate, and/or the size and thickness of the substrate.

At 506 a first top contiguous electrode pattern 508 may be formed directly on the top surface 110 of the compressive substrate 504 along with a portion of a second top contiguous electrode pattern 510 (which may not be "contiguous" until after a jumper or other connector is added to join formations in the electrode pattern). For example, the first top contiguous electrode pattern 508 may be formed with jumpers that connect formations comprising the first top contiguous electrode pattern 508. The portions of the second top contiguous electrode pattern 510 may include the formations, but not include the jumpers that connect the formations (and make the second electrode pattern "contiguous"). The first top contiguous electrode pattern 508 may be formed as a row using photolithography or any other technique discussed herein. The second top contiguous electrode pattern 510 may be formed as a column using photolithography or any other technique discussed herein.

At 512, one or more insulators 514 may be formed on the compressive substrate 504 and over at least a portion of the first top contiguous electrode pattern 508 to create isolation between the first top contiguous electrode pattern 508 and the second top contiguous electrode pattern 510 (or jumpers of the second top contiguous electrode pattern 510 that are discussed below). The one or more insulators 514 may be formed as local insulators which may span a narrow portion of the first top contiguous electrode pattern 508 between the larger formations of the first top contiguous electrode pattern 508. The insulators may be formed by photolithography, sputtering, and/or other techniques as discussed herein.

At 516, jumpers 518 may be formed to connect the formations of the second top contiguous electrode pattern 510. The jumpers 516 may be formed directly on the top surface 110 of the compressive substrate 504 and over at least a portion of the first top contiguous electrode pattern 508 and over at least a portion of the one or more insulators 514. The jumpers may be formed using of a same material as the second contiguous electrode pattern 518 or may be formed of a different material than the second contiguous electrode pattern 518. The jumper may be formed by photolithography, sputtering, and/or any other additive and/or subtractive process described herein to create the jumper to connect adjacent portions of an electrode pattern, which may be formed to bridge very small gaps at a micro and nanoscale.

Figure 6:
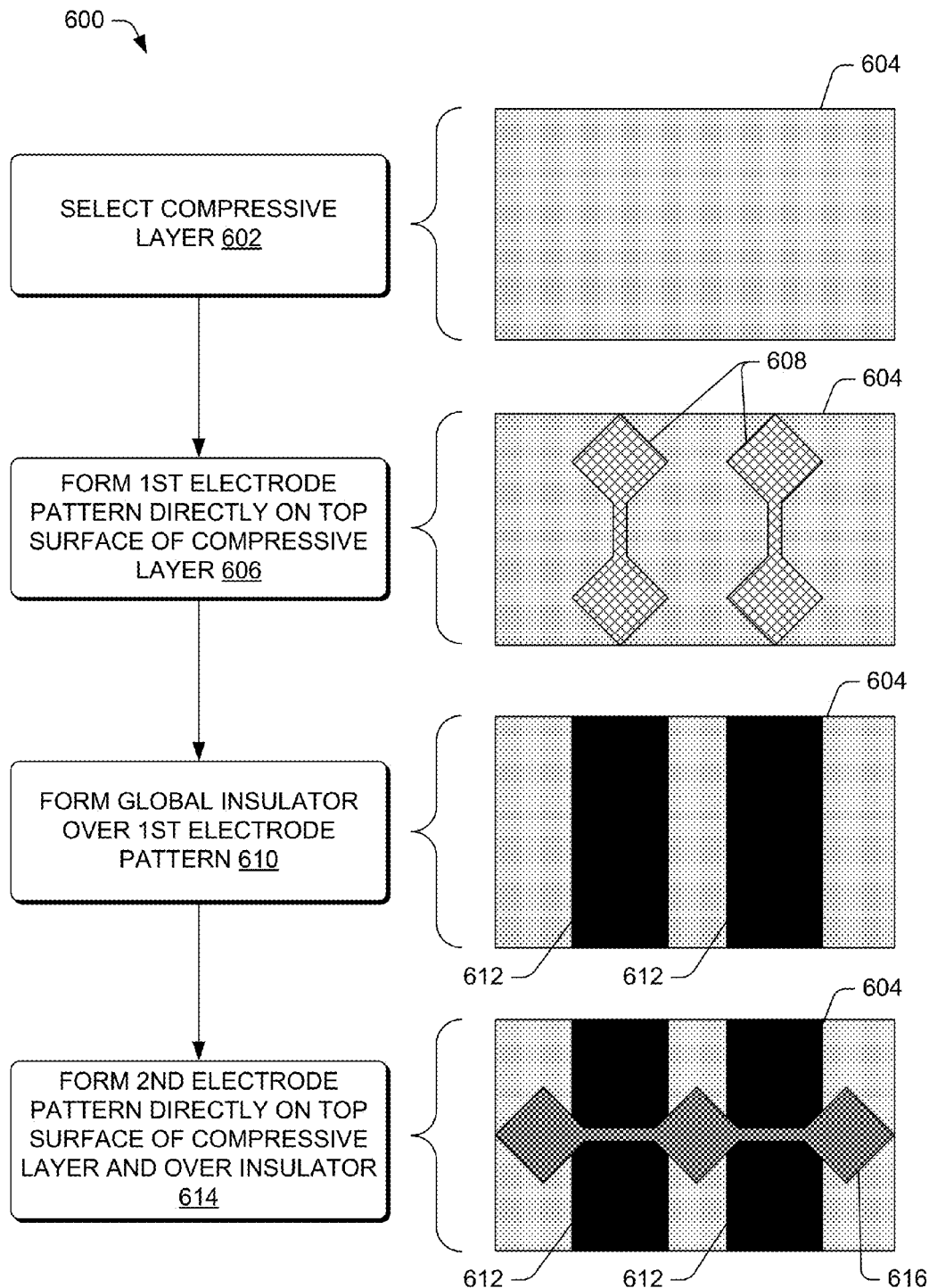
FIG. 6 is a pictorial flow diagram of an illustrative process to create a single layer compressive substrate force sensor using global isolation.

FIG. 6 is a pictorial flow diagram of an illustrative process 600 to create a single layer compressive substrate force sensor using a global insulator.

At 602, the compressive substrate 604 may be selected to be patterned to create the single layer compressive substrate force sensor. The selection may include a selection of the material or composition of the substrate, the compressive properties of the substrate, and/or the size and thickness of the substrate.

At 606, a first top contiguous electrode pattern 608 may be formed directly on the top surface 110 of the compressive substrate 604. The first top contiguous electrode pattern 608 may be formed using photolithography or any other technique discussed herein.

At 610, one or more insulators 612 may be formed on the compressive substrate 604 over at least a portion of the first top contiguous electrode pattern 608 to create isolation between the first top contiguous electrode pattern 608 and a subsequent electrode pattern formed over the first top contiguous electrode pattern 608. The one or more insulators 612 may be formed as global insulators and may cover a large "global" area, such as a large portion or all of the first top contiguous electrode pattern 608 and possibly other surface area of the compressive substrate 604.

At 614, a second top contiguous electrode pattern 616 may be formed directly on the top surface 110 of the compressive substrate 604 and over at least a portion of the first top contiguous electrode pattern 608 and over at least a portion of the one or more insulators 612. The second top contiguous electrode pattern 616 may be formed by photolithography and/or other techniques as discussed herein.

Figure 7:
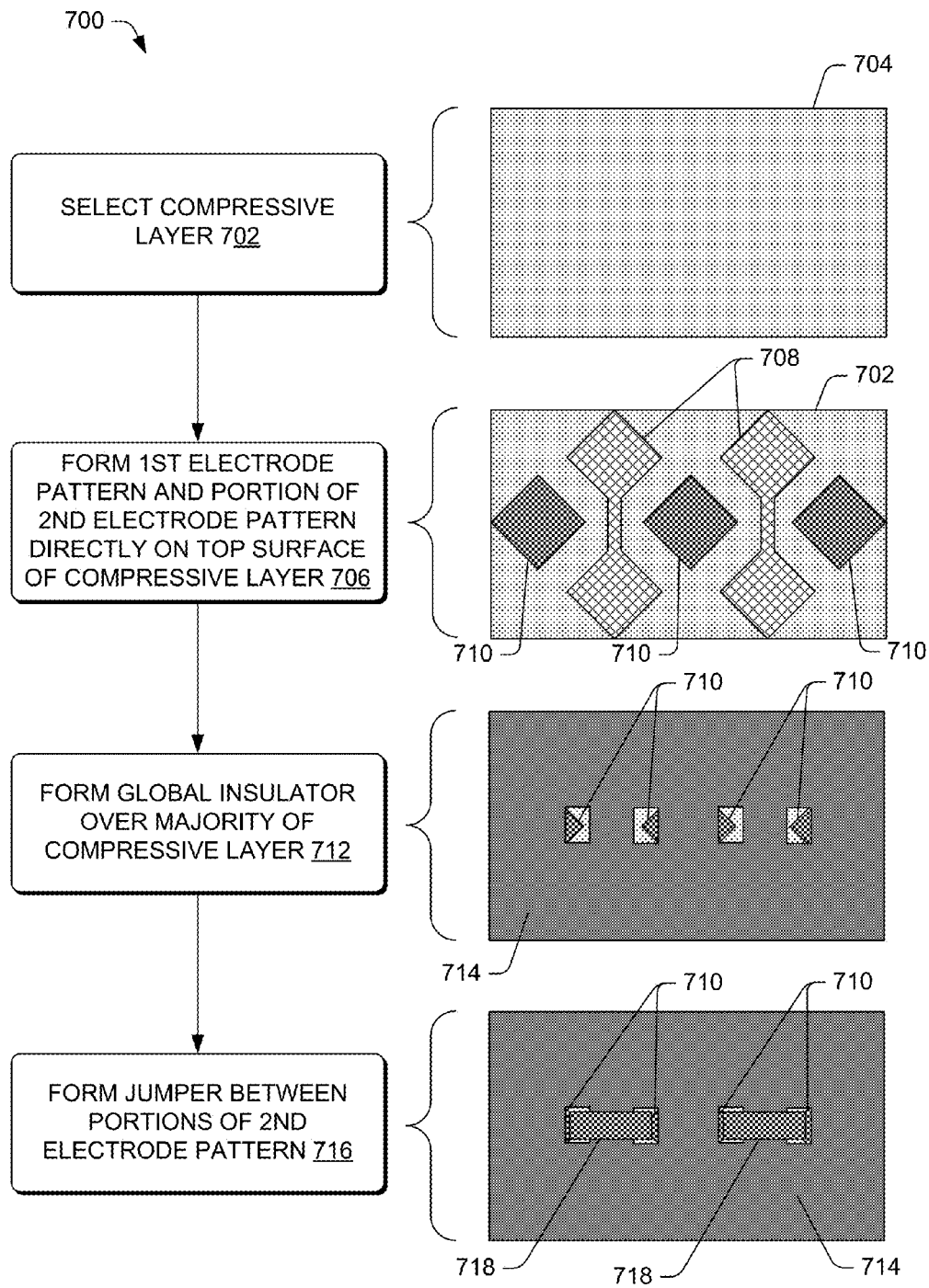
FIG. 7 is a pictorial flow diagram of another illustrative process to create a single layer compressive substrate force sensor using global isolation.

FIG. 7 is a pictorial flow diagram of another illustrative process 700 to create a single layer compressive substrate force sensor using global isolation.

At 702, the compressive substrate 704 may be selected to be patterned to create the single layer compressive substrate force sensor. The selection may include a selection of the material or composition of the substrate, the compressive properties of the substrate, and/or the size and thickness of the substrate.

At 706 a first top contiguous electrode pattern 708 may be formed directly on the top surface 110 of the compressive substrate 704 along with a portion of a second top contiguous electrode pattern 710 (which may not be "contiguous" until after a jumper or other connector is added to join formations in the electrode pattern). For example, the first top contiguous electrode pattern 708 may be formed with jumpers that connect formations comprising the first top contiguous electrode pattern 708. The portions of the second top contiguous electrode pattern 710 may include the formations, but not include the jumpers that connect the formations (and make the second electrode pattern "contiguous"). The first top contiguous electrode pattern 708 may be formed as a row using photolithography or any other technique discussed herein. The second top contiguous electrode pattern 710 may be formed as a column using photolithography or any other technique discussed herein.

At 712, an insulator 714 may be formed on the compressive substrate 604 over the first top contiguous electrode pattern 608 to create isolation between the first top contiguous electrode pattern 608 and a subsequent electrode pattern formed over the first top contiguous electrode pattern 608 and formed over the insulator 714. The insulator 714 may be formed as global insulator and may cover a large "global" area, but may leave connection areas between unconnected formations (e.g., portions of the second top contiguous electrode pattern 710 exposed for formation of jumpers, described below.

At 716, jumpers 718 may be formed to connect the formations of the second top contiguous electrode pattern 710. The jumpers 716 may be formed directly on the top surface 110 of the compressive substrate 704 and over at least a portion of the first top contiguous electrode pattern 708 and over at least a portion of the one or more insulators 714. The jumpers may be formed using of a same material as the second contiguous electrode pattern 718 or may be formed of a different material than the second contiguous electrode pattern 718. The jumper may be formed by photolithography, sputtering, and/or any other additive and/or subtractive process described herein to create the jumper to connect adjacent portions of an electrode pattern, which may be formed to bridge very small gaps at a micro and nanoscale.

Figure 8A:
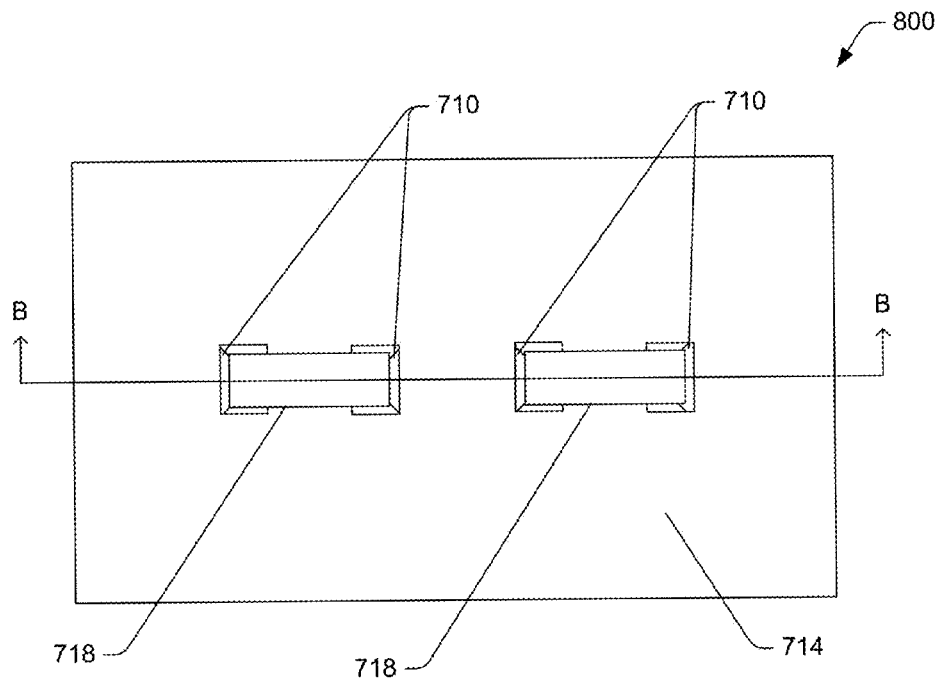
FIG. 8A shows a top plan view of the single layer compressive substrate force sensor described in FIG. 7.

FIG. 8A shows a top plan view of a single layer compressive substrate force sensor 800 which may be the same as the single layer compressive substrate force sensor created using the process 700 described in association with FIG. 7.

Figure 8B:
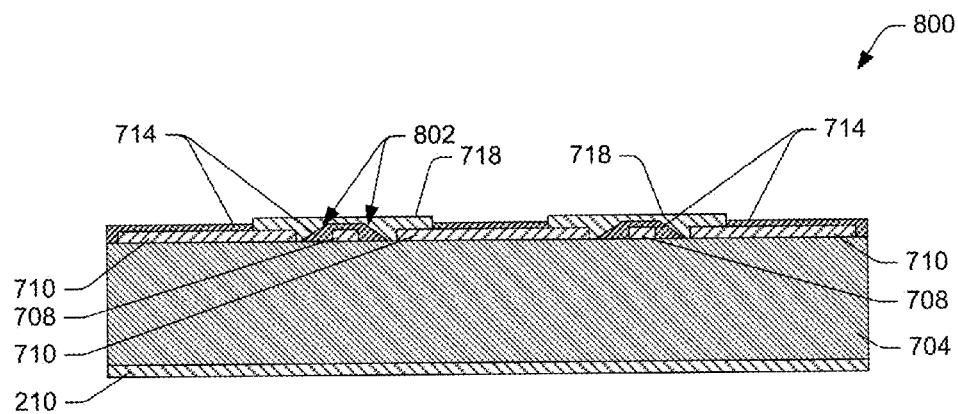
FIG. 8B is cross-sectional side elevation view of the single layer compressive substrate force sensor shown in FIG. 8A.

FIG. 8B is cross-sectional side elevation view of the single layer compressive substrate force sensor 800 shown in FIG. 8A along section line B-B. As shown in FIG. 8B, the insulation layer 714 extends across a majority of the top surface of the compressive substrate 704. The third electrode pattern 210 may be formed on a bottom side of the compressive substrate 704, as discussed above with reference to FIG. 2B. When forming the insulation 718 as a global insulator, a portion of the insulator 802 proximate to the first top contiguous electrode pattern 708 may include a tapered profile angled toward the surface of the compressive substrate 704, which may help ensure formation of an adequate electrical connection between the jumper 718 and the second top contiguous electrode pattern 710 during formation of the jumper 718.

Figure 9:
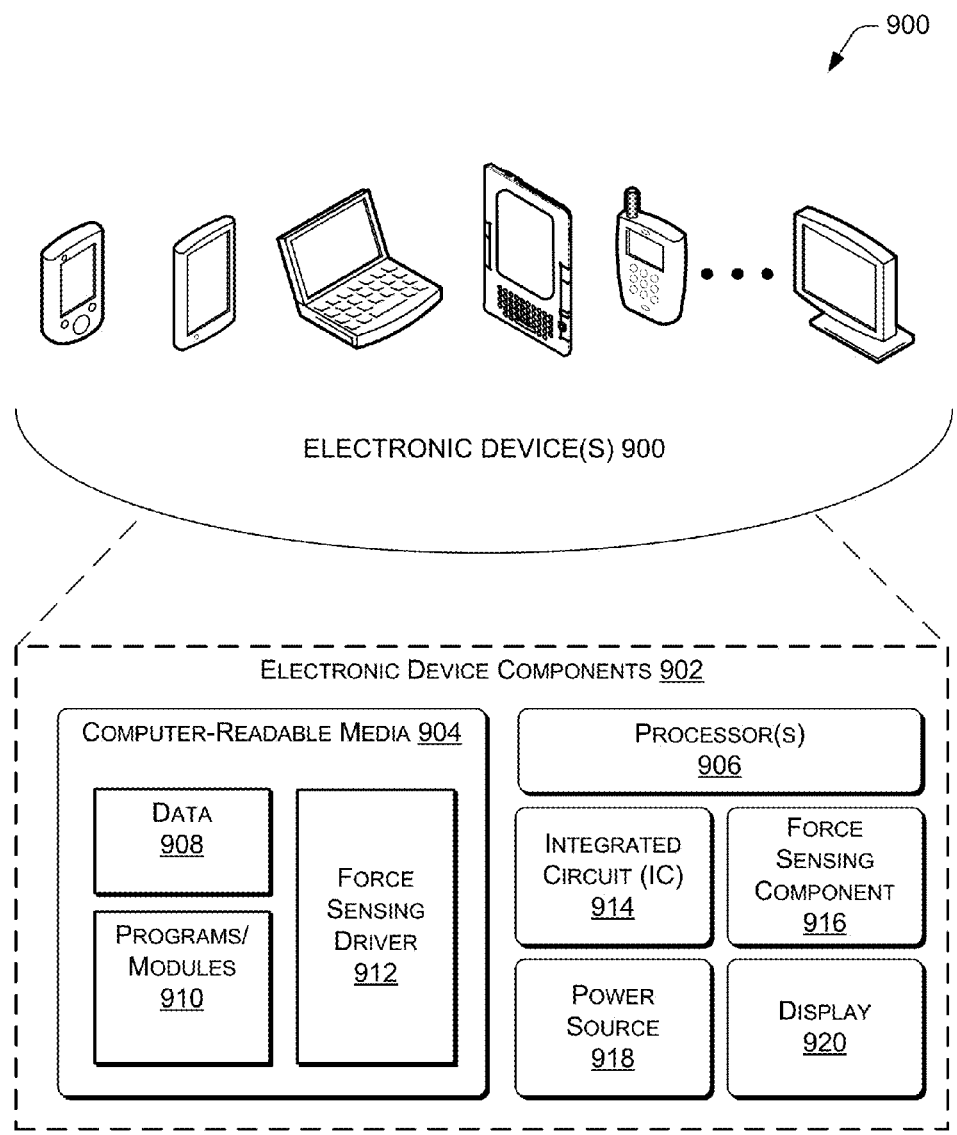
FIG. 9 is a schematic view of an illustrative electronic device that includes a force sensor component.

FIG. 9 is a schematic view of one or more illustrative electronic device(s) 900 ("devices 900") that includes a force sensor component. In the illustrated implementation, the devices 900 are represented by various computing devices that each includes a power source and an output mechanism, such as a display. A non-exhaustive list of the devices 900 may include a notebook computer, a music player, a mobile telephone (including smartphones), a tablet computer, an electronic book (eBook) reader device, a monitor (with or without a television tuner), a track pad, and so forth. However, many other types of devices may be configured to operate in various modes, which may include a reduced operational mode as discussed herein.

As illustrated, the devices 900 include various components 902. In some embodiments, the components 902 include computer-readable media 904 and one or more processor(s) 906. The processor(s) 906 interact with the computer-readable media 904 to execute instructions and facilitate operation of the device 900. The computer-readable media 904, meanwhile, may be used to store data 908, such as data files, audio and/or video media, electronic books (eBooks), or the like. The computer-readable media 904 may also include software programs or other executable modules 910 that may be executed by the processor(s) 906. Examples of such programs or modules include indexing modules for indexing data, reader programs, control modules (e.g., power management), network connection software, an operating system, sensor algorithms, and so forth.

The computer-readable media 904 may include volatile memory (such as RAM), nonvolatile memory, removable memory, and/or non-removable memory, implemented in any method or technology for storage of information, such as computer-readable instructions, data structures, program modules, or other data. Also, the processor(s) 906 may include onboard memory in addition to or instead of the memory 904. Some examples of storage media that may be included in the computer-readable media 904 and/or processor(s) 906 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the devices 900. Any such computer-readable media may be part of the devices 900.

The computer-readable media 904 may also store component drivers that include instructions that, when executed by the processor(s), are used to control the various components 902. In accordance with one or more embodiments, the computer-readable media 904 may include a force sensing driver 912 that may be used to receive signals from an integrated circuit (IC) 914 that is connected to a force sensing component 916 having the electrode patterns discussed above. The force sensing driver 112 may process the signals and provide an output, such as a coordinate, a measured force value, a velocity, an acceleration, and/or other outputs.

In some embodiments, the IC 914 may directly measure changes in electrical fields caused by user-interaction (via a finger and/or input device) with the force sensing component 916 to determine a coordinate, a measured force value, a velocity, an acceleration, and/or other outputs, and provide outputs to the processor(s) 906, possibly without use of a driver. The IC 914 may be coupled to a power source 918, such as a battery. The IC 914 may manage power input into the electrode patterns to cause the electrode patterns to operate as receivers and/or transmitters as discussed above. The electronic devices may include a display 920, which may provide a visual output. The display 920 may include the force sensing component 916, such as when the display 920 is a touch sensor display.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A force sensing capacitance touch sensor comprising:
a single layer compressive substrate having a top side and a bottom side opposite to the top side;
a first set of electrodes and a first portion of a second set of electrodes disposed on the top side of the single layer compressive substrate, the first set of electrodes and the first portion of the second set of electrodes including conductive material in direct contact with a top surface of the top side of the single layer compressive substrate and forming two patterns as a single layer of electrodes, and the first set of electrodes forming a first contiguous pattern independent from the second set of electrodes;
a plurality of insulators disposed on the top side of the single layer compressive substrate and over portions of the first set of electrodes;
a second portion of the second set of electrodes disposed over at least a portion of the plurality of insulators, the second portion of the second set of electrodes and the first portion of the second set of electrodes forming a second contiguous pattern;
a third set of electrodes disposed on the bottom side of the single layer compressive substrate, the third set of electrodes including the conductive material in direct contact with a bottom surface of the bottom side of the single layer compressive substrate; and
an integrated circuit in connection with the first set of electrodes, the second set of electrodes, and the third set of electrodes, wherein the integrated circuit is configured to:
determine, via the second set of electrodes, a location associated with a first change in a first electrical field created between the first set of electrodes and the second set of electrodes, the first change in the first electrical field caused by presence of a finger or an input device proximate to the second set of electrodes that modifies attributes of the first electrical field, and
measure, via the third set of electrodes, a force caused by a second change in a second electrical field created between the first set of electrodes and the third set of electrodes, the second change in the second electrical field caused by deformation of both the first set of electrodes and the single layer compressive substrate resulting from contact between the finger or the input device and the single layer compressive substrate.

2. The force sensing capacitance touch sensor as recited in claim 1, wherein each of the plurality of insulators include tapered edges that tapper downward toward the single layer compressive substrate, the tapered edges providing a surface profile to support the second set of electrodes that extend over the plurality of insulators.

3. The force sensing capacitance touch sensor as recited in claim 1, further comprising jumpers to electrically connect adjacent formations of the second set of electrodes to form the second contiguous pattern.

4. The force sensing capacitance touch sensor as recited in claim 1, wherein the first set of electrodes, the second set of electrodes, and the third set of electrodes comprise at least one of Carbon Nanotube (CNT) or Silver Nanowire (AgNW), and wherein the single layer compressive substrate comprises at least one of silicone or urethane.

5. A method of manufacturing a force sensing capacitance touch sensor, the method comprising:
providing a single layer compressive substrate having a first surface and an opposing second surface;
forming a first set of electrodes and at least a portion of a second set of electrodes on the first surface by using an additive process to add conductive material directly on the first surface, wherein the first set of electrodes is formed contemporaneously with the at least a portion of the second set of electrodes;
forming an insulator on the first surface and directly over portions of the first set of electrodes;
forming an electrical connection between a first portion of the second set of electrodes directly over at least a portion of the insulator and a second portion of the second set of electrodes, wherein the insulator electrically isolates the first set of electrodes from the second set of electrodes; and
forming a third set of electrodes on the opposing second surface of the single layer compressive substrate by using the additive process to add the conductive material directly on the opposing second surface.

6. The method as recited in claim 5, further comprising connecting an integrated circuit to the first set of electrodes, the second set of electrodes, and the third set of electrodes during formation of the first set of electrodes, the second set of electrodes, and the third set of electrodes.

7. The method as recited in claim 5, wherein the first set of electrodes comprises electrode formations connected together by connectors, each connector to connect adjacent electrode formations to one another, and wherein forming the insulator includes forming a localized insulator over at least a portion of each connector of the first set of electrodes.

8. The method as recited in claim 5, wherein forming the insulator includes forming an expansive insulator that substantially covers the first surface while leaving portions of electrodes of the second set of electrodes exposed for subsequent formation of electrical connections.

9. The method as recited in claim 8 further comprising forming the electrical connections to connect a first exposed portion of electrodes of the second set of electrodes to a second exposed portion of the electrodes of the second set of electrodes.

10. The method as recited in claim 5, wherein forming the first set of electrodes and the at least a portion of the second set of electrodes includes:
using an additive process to add a single layer of conductive material directly on the first surface of the single layer compressive substrate and removing a portion of the single layer of conductive material to form the first set of electrodes and the at least a portion of the second set of electrodes.

11. An apparatus comprising:

a single layer compressive substrate having a top surface and a bottom surface opposite to the top surface;

a first set of electrodes formed as columns directly on the top surface of the single layer compressive substrate, the first set of electrodes including conductive material in direct contact with the top surface;

a second set of electrodes formed as rows directly on the bottom surface of the single layer compressive substrate, the second set of electrodes including the conductive material in direct contact with the bottom surface;

a third set of electrodes formed as rows on the top surface of the single layer compressive substrate and over portions of the first set of electrodes, at least a portion of the third set of electrodes and the first set of electrodes forming two patterns as a single layer of electrodes directly on the top surface of the single layer compressive substrate;

a plurality of insulators disposed on the top side of the single layer compressive substrate and over the portions of the first set of electrodes, each insulator individually formed in a local area at an intersection between a portion of each first electrode and a portion of each third electrode, and the plurality of insulators formed of a non-conductive material to electrically isolate the first set of electrodes from the third set of electrodes; and an integrated circuit in connection with the first set of electrodes, the second set of electrodes, and the third set of electrodes, the integrated circuit to:

create a first electrical field between the first set of electrodes and the second set of electrodes, and a second electrical field between the first set of electrodes and the third set of electrodes, measure, via the second set of electrodes, a force caused by a first change in the first electrical field transmitted by the first set of electrodes, the first change in the first electrical field caused by deformation of both the first set of electrodes and the single layer compressive substrate resulting from a force of a finger or an input device against the single layer compressive substrate; and determine, via the third set of electrodes, a location associated with a second change in the second electrical field created between the first set of electrodes and the third set of electrodes, the second change in the second electrical field caused by presence of the finger or the input device proximate to the third set of electrodes that modifies attributes of the second electrical field.

12. The apparatus recited in claim 11, wherein the single layer compressive substrate comprises at least one of silicone or urethane.

13. The apparatus recited in claim 11, wherein the first set of electrodes comprises at least one of Indium Tin Oxide (ITO), Carbon Nanotube (CNT), or Silver Nanowire (AgNW).

14. The apparatus recited in claim 11, further comprising electrical connectors that connect adjacent electrodes of the second set of electrodes to each other to create contiguous rows.

15. The apparatus recited in claim 11, wherein the first set of electrodes includes adjacent formations of electrodes connected to one another by electrical connectors that create a contiguous row or column of electrically connected electrodes.

16. The apparatus recited in claim 11, wherein the first set of electrodes is semi-transparent, and wherein the apparatus is configured for use in a touch display.

* * * * *